(12) United States Patent
Hunsberger et al.

(10) Patent No.: US 8,782,917 B2
(45) Date of Patent: Jul. 22, 2014

(54) DISC BRAKE FOR A TAPE MEASURE

(75) Inventors: Matthew Hunsberger, Vancouver (CA); Rob Nielson, North Vancouver (CA)

(73) Assignee: Rob Nielson, North Vancouver (CA)

(*) Notice: Subject to any disclaimer, the term of this patent is extended or adjusted under 35 U.S.C. 154(b) by 154 days.

(21) Appl. No.: 13/381,353

(22) PCT Filed: Jun. 29, 2010

(86) PCT No.: PCT/CA2010/001004
§ 371 (c)(1),
(2), (4) Date: Feb. 5, 2012

(87) PCT Pub. No.: WO2011/000092
PCT Pub. Date: Jan. 6, 2011

(65) Prior Publication Data
US 2012/0131810 A1    May 31, 2012

Related U.S. Application Data

(60) Provisional application No. 61/221,493, filed on Jun. 29, 2009.

(51) Int. Cl.
*G01B 3/10* (2006.01)
(52) U.S. Cl.
USPC .......................................................... 33/767
(58) Field of Classification Search
USPC .......................................................... 33/767
See application file for complete search history.

(56) References Cited

U.S. PATENT DOCUMENTS

| | | | | |
|---|---|---|---|---|
| 2,079,908 A | * | 5/1937 | House | 33/767 |
| 3,889,897 A | * | 6/1975 | Van Zelderen | 242/381.5 |
| 4,068,383 A | | 1/1978 | Krebs | |
| 4,121,785 A | | 10/1978 | Quenot | |
| 4,443,944 A | | 4/1984 | Beesley | |
| 4,527,334 A | * | 7/1985 | Jones et al. | 33/761 |
| 4,555,854 A | * | 12/1985 | Kuntze | 33/767 |
| 4,663,854 A | * | 5/1987 | Miller et al. | 33/767 |
| 4,765,557 A | * | 8/1988 | Kahmann | 242/381.6 |
| 4,856,726 A | | 8/1989 | Kang | |
| 5,245,761 A | | 9/1993 | Waldherr | |
| 5,471,761 A | * | 12/1995 | Cheng | 33/761 |

(Continued)

FOREIGN PATENT DOCUMENTS

| | | |
|---|---|---|
| EP | 0531570 | 3/1993 |
| GB | 1456520 | 11/1976 |

OTHER PUBLICATIONS

Abstract of European Publication No. 0531570 with data supplied by the espacenet database.

*Primary Examiner* — Christopher Fulton
(74) *Attorney, Agent, or Firm* — Cameron IP

(57) ABSTRACT

A tape measure comprises a housing having a tape reel rotatably mounted therein. A measuring tape is at least partially coiled about the tape reel. The measuring tape is movable between an extended position and a retracted position. In the extended position at least a portion of the measuring tape extends outwardly of the housing. In the retracted position the measuring tape is substantially coiled about the tape reel and disposed within the housing. A spring mechanism biases the tape reel to rotate so as move the measuring tape from the extended position to the retracted position. A disc brake mechanism applies a frictional force to the tape reel to control rotation of the tape reel.

14 Claims, 6 Drawing Sheets

(56) References Cited

U.S. PATENT DOCUMENTS

| | | |
|---|---|---|
| 6,053,447 A | 4/2000 | Omri |
| 6,134,801 A | 10/2000 | Miyasaka |
| 6,467,182 B2 | 10/2002 | Usami |
| 7,370,432 B2 * | 5/2008 | DuBois ............................ 33/761 |
| 7,444,758 B1 | 11/2008 | Lin |
| 8,056,849 B2 * | 11/2011 | Ng et al. ..................... 242/378.2 |
| 8,215,027 B2 * | 7/2012 | Kang ............................... 33/761 |
| 2004/0035017 A1 * | 2/2004 | Yang ............................... 33/767 |

\* cited by examiner

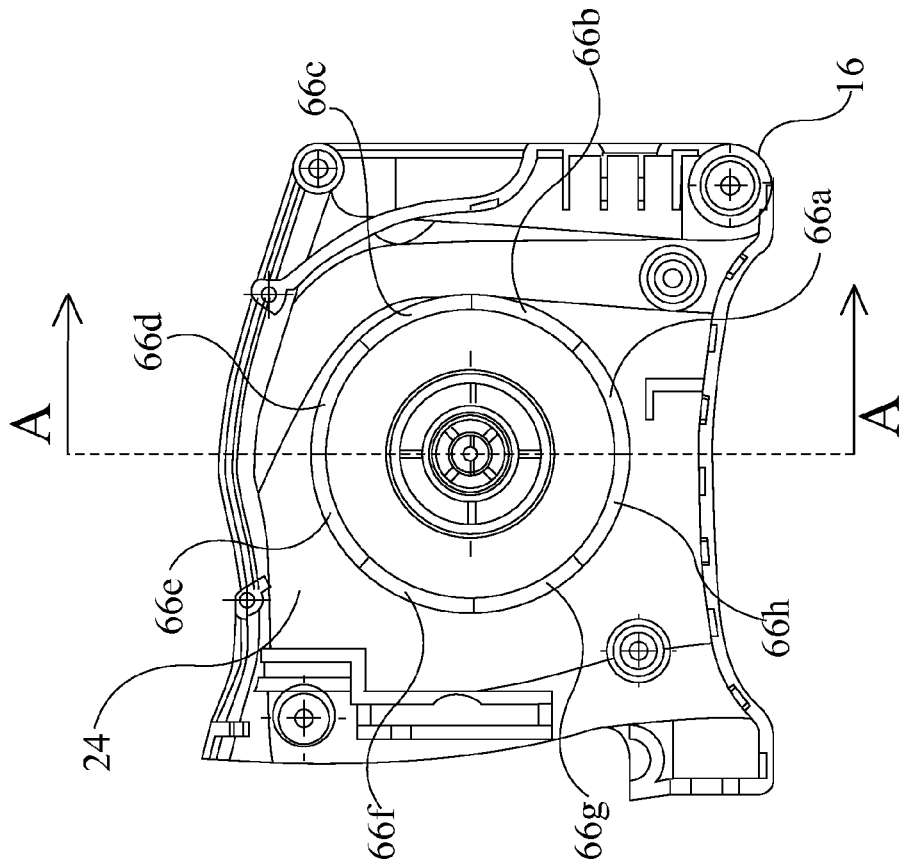
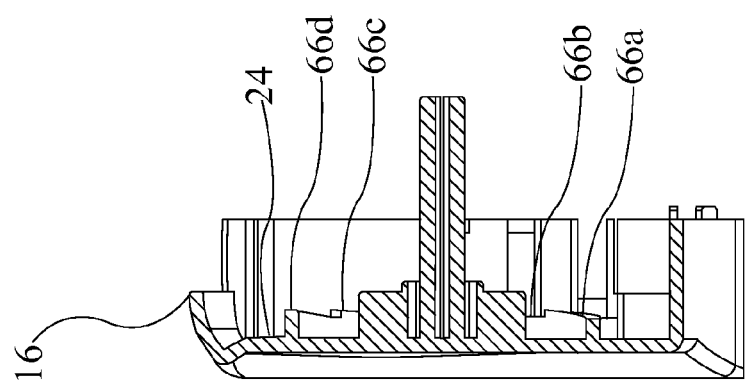
Fig. 5
Fig. 6

DISC BRAKE FOR A TAPE MEASURE

CROSS-REFERENCE TO RELATED APPLICATION

Field of the Invention

This application claims the benefit of provisional application 61/221,493 filed in the United States Patent and Trademark Office on Jun. 29, 2010, the disclosure of which is incorporated herein by reference and priority to which is claimed.

BACKGROUND OF THE INVENTION

Field of the Invention

The present invention relates to a tape measure and, in particular, to a tape measure provided with a disc brake mechanism.

Description of the Related Art

Tape measures generally include a measuring tape coiled about a tape reel disposed within a housing. A hook mounted on a free end of the measuring tape extends through a slot in the housing. This allows a user to extend the measuring tape outwardly of the housing in order to take a measurement using measuring indicia displayed on the measuring tape. In spring loaded tape measures, a spring mechanism biases the tape reel to retract the measuring tape into the housing to facilitate transport and storage of the tape measure. Spring loaded tape measures are therefore also provided with a locking mechanism to prevent retraction of the measuring tape while a measurement is being taken.

Conventional locking mechanisms include an abutment member which is movable between a released position and an engaged position. Typically the abutment member is actuated by a lever disposed near a top of the housing. In the released position, the abutment member is spaced-apart from the measuring tape and does not restrict extension or retraction of the measuring tape. This allows a user to extend the measuring tape outwardly of the housing to take a measurement. In the engaged position, the abutment member abuts the measuring tape against a bottom of the housing and restricts extension and retraction of the measuring tape. This prevents the measuring tape from retracting into the housing while a measurement is being taken. The locking mechanism is released, after the measurement is taken, to allow the measuring tape to retract into the housing. The locking mechanism accordingly controls retraction of the measuring tape into the housing.

However, conventional locking mechanisms do not control the rate at which the measuring tape retracts into the housing when the locking mechanism is released. This is because the locking mechanism can only be in the engaged position where retraction of the measuring tape is arrested, or the released position where retraction of the measuring tape is not arrested. The measuring tape of a spring loaded tape measure may therefore freewheel into the housing when the locking mechanism is released. This may cause the hook at a free end of the measuring tape to break off or otherwise damage the measuring tape.

U.S. Pat. No. 6,467,182 issued on Oct. 22, 2002 to Usami discloses a tape measure provided with a braking mechanism for controlling the rate at which a measuring tape retracts into the housing. A brake shoe contacts an outer circumferential part of a tape reel to apply a braking force which restricts rotation of the tape reel. This may prevent inadvertent retraction of the measuring tape.

Yet there still remains a need for improved locking mechanisms for a spring loaded tape measure.

SUMMARY OF THE INVENTION

It is an object of the present invention to provide an improved locking mechanism for a tape measure.

It is another object of the present invention to provide an improved locking mechanism that controls the rate at which the measuring tape of a spring loaded tape measure is retracted into the housing.

There is accordingly provided a tape measure comprising a housing having a tape reel rotatably mounted therein. A measuring tape is at least partially coiled about the tape reel. The measuring tape is movable between an extended position and a retracted position. In the extended position at least a portion of the measuring tape extends outwardly of the housing. In the retracted position the measuring tape is substantially coiled about the tape reel and disposed within the housing. A spring mechanism biases the tape reel to rotate so as to move the measuring tape from the extended position towards the retracted position. The spring mechanism may include a coiled flat spring. A disc brake mechanism applies a frictional force to the tape reel to control rotation of the tape reel.

In one embodiment, the disc brake mechanism applies a frictional force to the tape reel to control rotation of the tape reel and movement of the measuring tape from the extended position towards the retracted position. The disc brake mechanism includes a disc rotatably mounted within the housing and a biasing spring for biasing the disc. A first side of the disc functions as a brake pad to engage the tape reel so as to apply the frictional force to the tape reel. A second side of the disc has a plurality of inclined cam surfaces arranged in annular formation. The cam surfaces interact with a plurality of corresponding inclined cam surfaces arranged in annular formation on an inner wall of the housing. Rotation of the disc in a first direction causes the brake pad to move towards the tape reel and rotation of the disc in a second direction causes the brake pad to move away from the tape reel. The biasing spring biases the disc to rotate in the first direction. In another embodiment, the biasing spring biases the disc to rotate in the second direction.

The second side of the disc may have eight inclined cam surfaces, each of which is inclined 40 degrees. The inner wall of the housing may have eight corresponding cam surfaces, each of which is inclined 40 degrees. The tape measure may further include a lever for rotating the disc.

The disc brake mechanism may prevent the measuring tape from freewheeling and control the rate at which the measuring tape retracts into the housing.

BRIEF DESCRIPTION OF DRAWINGS

The invention will be more readily understood from the following description of the embodiments thereof given, by way of example only, with reference to the accompanying drawings, in which:

FIG. 5 is a side elevation view of an inside of the first housing half of the tape measure of FIG. 1;

FIG. 6 is a sectional view taken along line A-A of FIG. 5;

DESCRIPTION OF THE PREFERRED EMBODIMENTS

Figure 1:
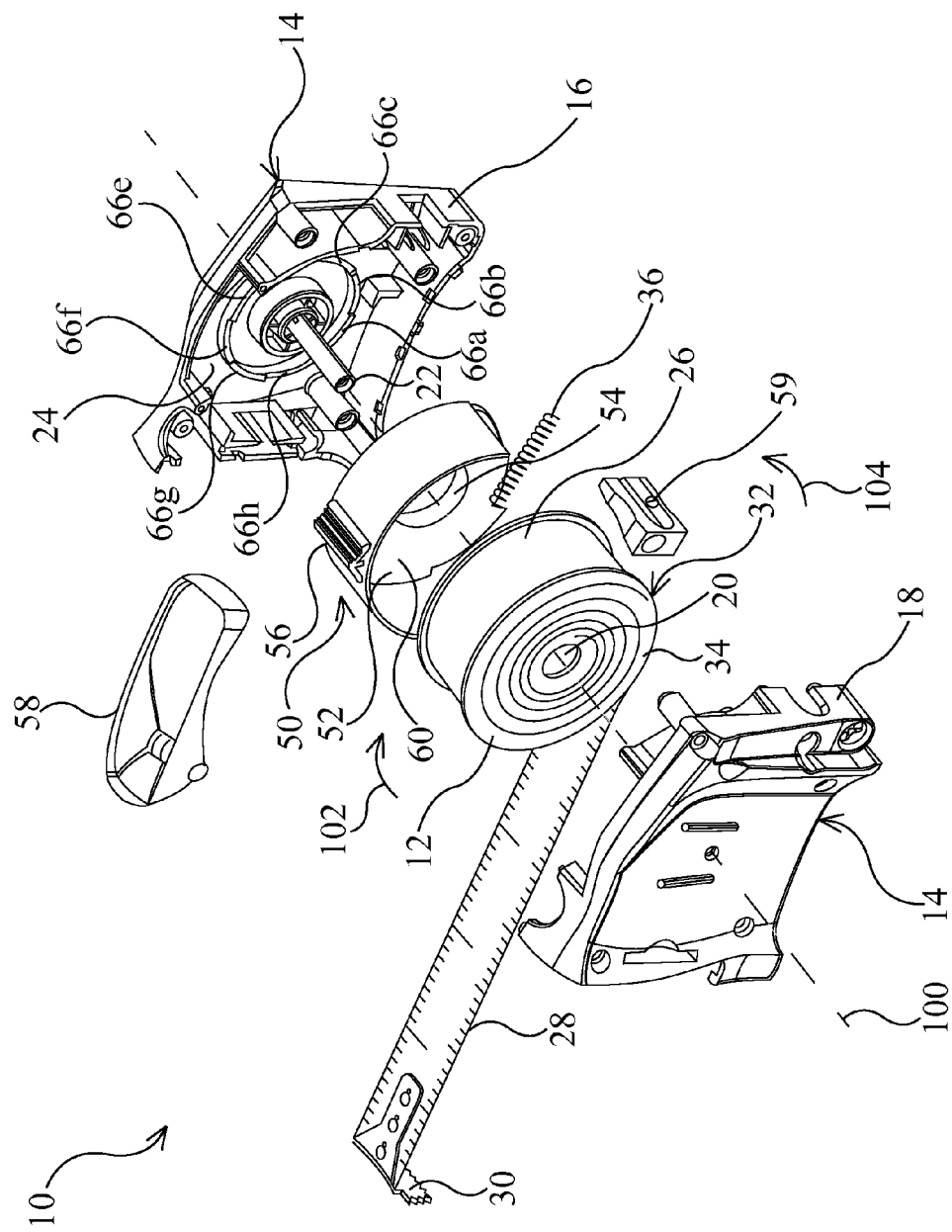
FIG. 1 is an exploded view of a tape measure provided with an improved locking mechanism.
Figure 2:
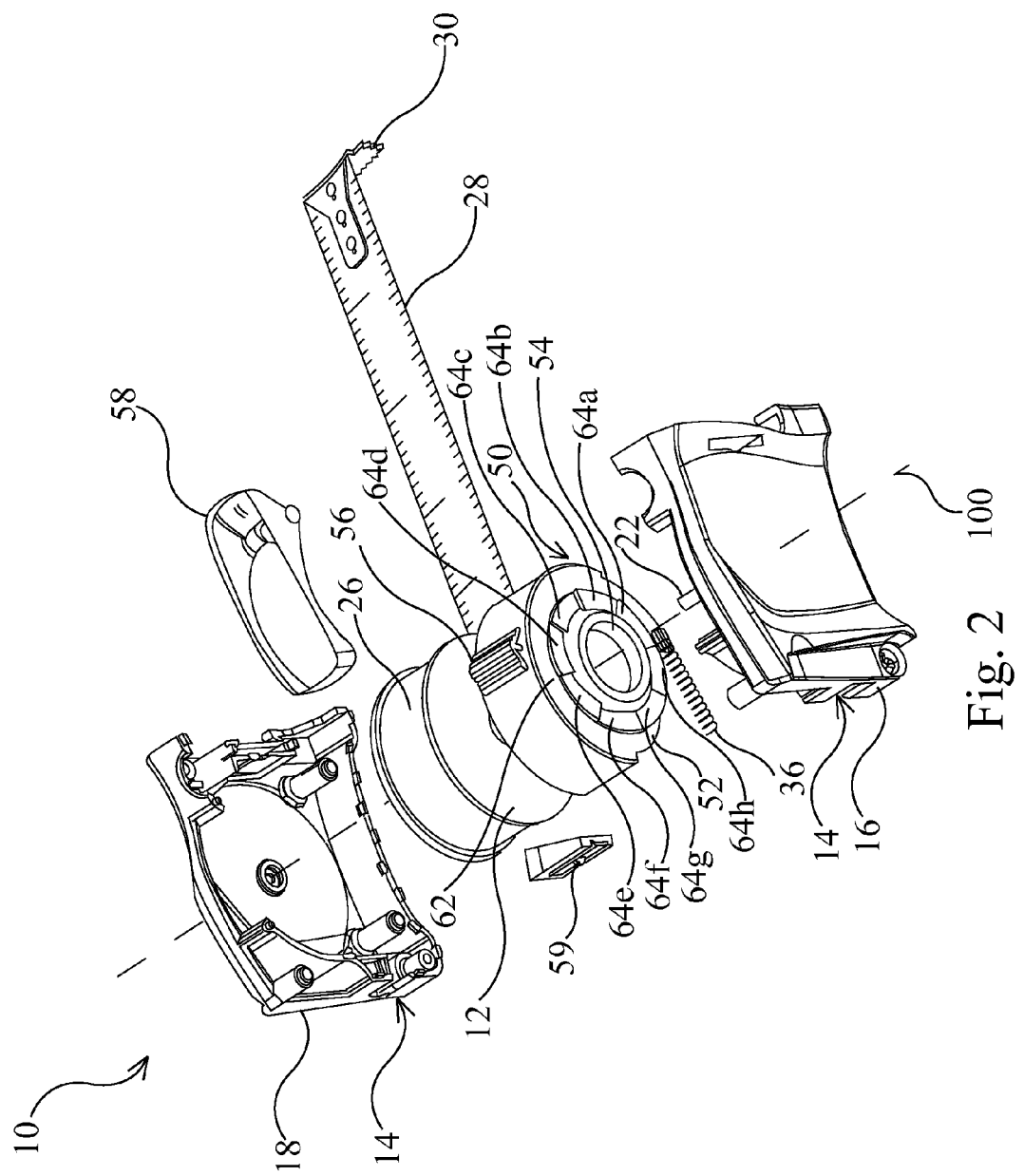
FIG. 2 is another exploded view of the tape measure of FIG. 1.

Referring to the drawings and first to FIGS. 1 and 2, these show exploded views of an improved tape measure 10. The tape measure 10 includes a tape reel 12 which is cylindrical in this example and disposed within a housing 14. In this example, the housing 14 includes two housing halves 16 and 18. The tape reel 12 has an opening 20 extending through a center thereof. The opening 20 allows the tape reel 12 to be rotatably mounted on a shaft 22 that extends from an inner wall 24 of a first one of the housing halves 16. The tape reel 12 is also provided with a spring mechanism 32. In this example, the spring mechanism 32 includes a coiled flat spring 34. A measuring tape 26 is attached to and coiled about a hub (not shown) of the tape reel 12. The measuring tape 26 is provided with measuring indicia 28 displayed thereon and a hook 30 at a free end thereof.

The measuring tape 26 is movable between an extended position and a retracted position. In the extended position the measuring tape 26 extends substantially linearly outside the housing 14. In the retracted position the measuring tape 26 is substantially coiled completely about the tape reel 12 and is disposed within the housing 14. The tape reel 12 rotates about an axis of rotation 100 when the measuring tape 26 is moved between the extended and retracted positions. The axis of rotation 100 is substantially coaxial with a longitudinal axis of the shaft 22. The tape reel 12 rotates in the direction indicated by arrow 102, in FIG. 1, when the measuring tape 26 is moved towards the extended position. The tape reel 12 rotates in the direction indicated by arrow 104 when the measuring tape 26 is moved towards the retracted position. The spring mechanism 32 biases the tape reel 12 to rotate in the direction indicated by arrow 104, in FIG. 1, to maintain the measuring tape 26 in the retracted position. In this example, the tape measure 10 is also provided with an integral pencil sharpener 59. As thus far described, the tape measure 10 is conventional.

However, the tape measure 10 disclosed herein is further provided with an improved locking mechanism and, in particular, a disc brake mechanism which is indicated generally by reference numeral 50. The disc brake mechanism 50 includes a disc 52 having an opening 54 extending through a center thereof. The opening 54 allows the disc 52 to be disposed about the shaft 22, between the tape reel 12 and the first one of the housing halves 16. A lever 56, which extends from the disc 52, allows a user to rotate the disc 52 about the axis of rotation 100. The lever 56 may be disposed within an enclosure 58 which limits arcuate movement of the lever 56 and rotation of the disc 52. The disc 52 is also coupled to a biasing spring 36.

Figures 3, 4:
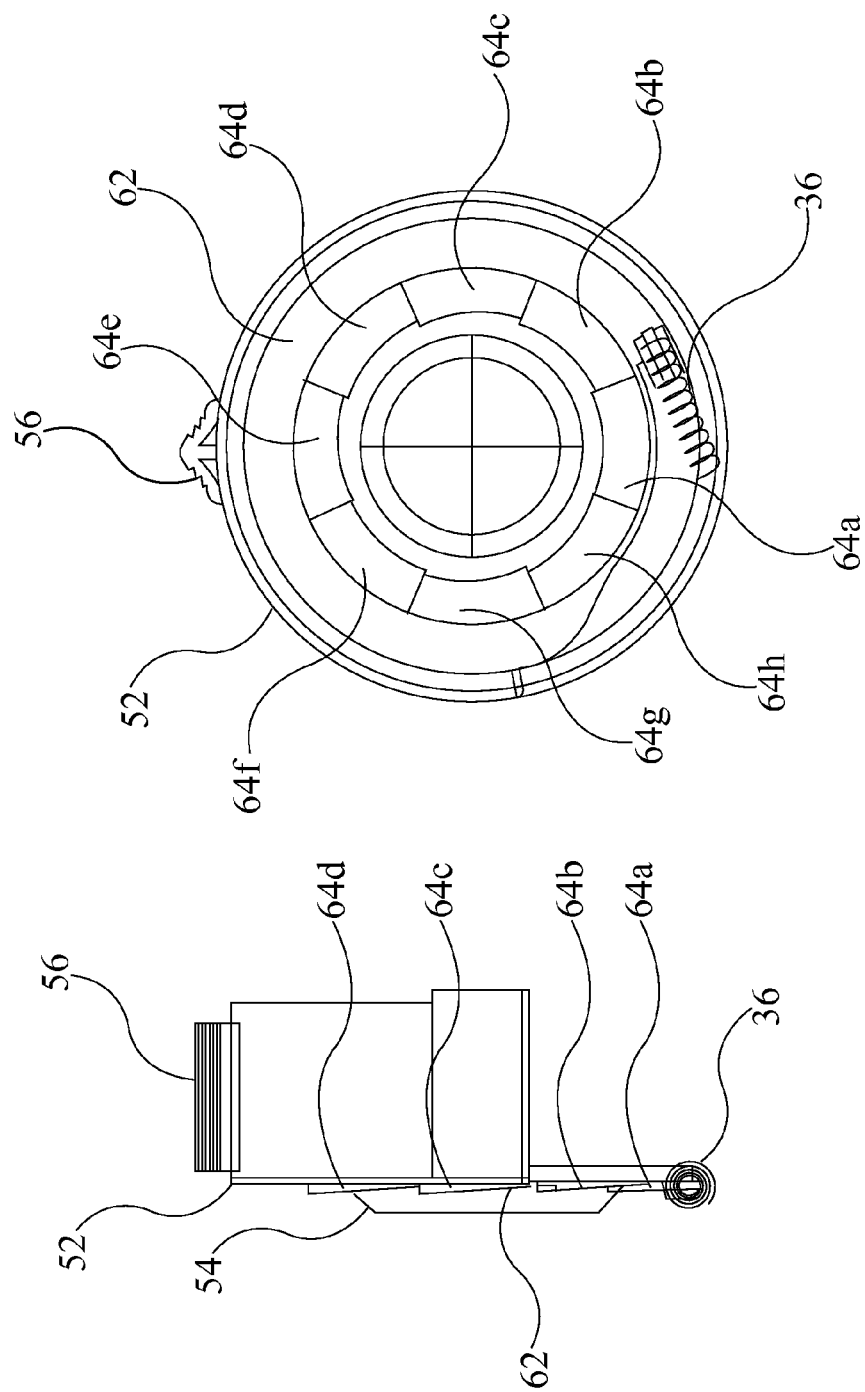
FIG. 3 is a front elevation view of a disc of the locking mechanism of the tape measure of FIG. 1.
FIG. 4 is a side elevation view of the disc of the locking mechanism of the tape measure of FIG. 1.

As best shown in FIG. 1, a first side 60 of the disc 52 has a substantially annular, planar surface which functions as a brake pad. As shown in FIGS. 2 to 4, a second side 62 of the disc 52 is provided with a plurality of inclined cam surfaces 64a, 64b, 64c, 64d, 64e, 64f, 64g and 64h which are arranged in an annular formation about the axis of rotation 100 shown in FIG. 2. In this example, there are eight cam surfaces on the disc 52, each inclined forty degrees. Referring back to FIG. 1 and with reference to FIGS. 5 and 6, the inner wall 24 of the first one of the housing halves 16 is also provided with a plurality of inclined cam surfaces 66a, 66b, 66c, 66d, 66e, 64f, 64g and 64h which are arranged in an annular formation about the axis of rotation 100. The cam surfaces on the inner wall 24 of the first housing half 16 are also each inclined forty degrees and interact with the cam surfaces on the disc 52 as described below.

Figure 7:
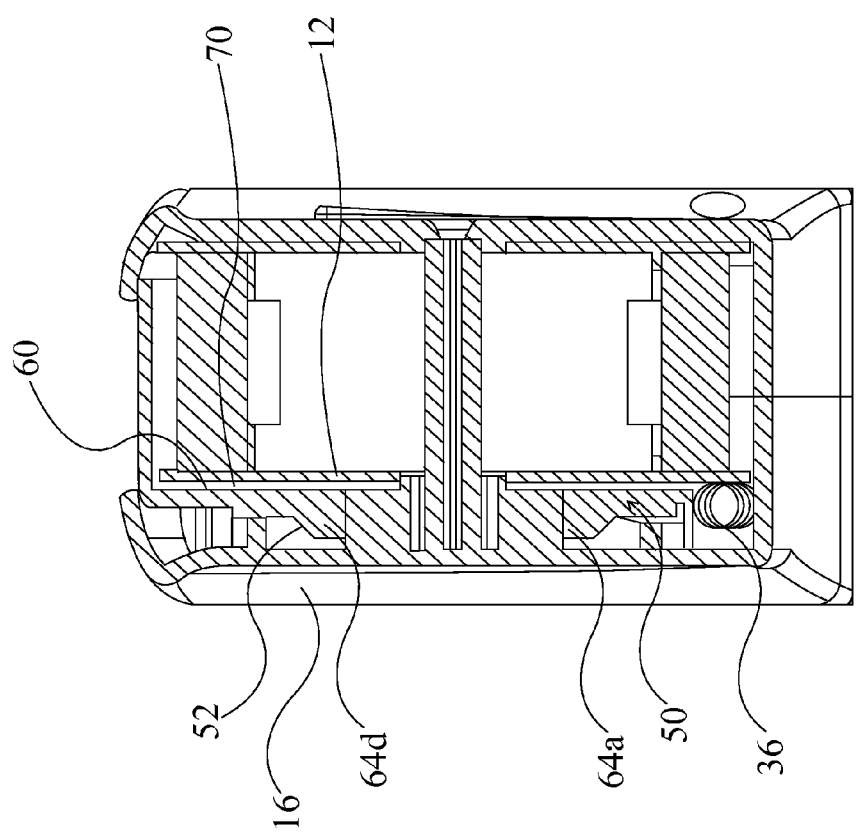
FIG. 7 is an end elevation view, partially in section, showing the disc brake mechanism of the tape measure of FIG. 1 in a released position.
Figure 8:
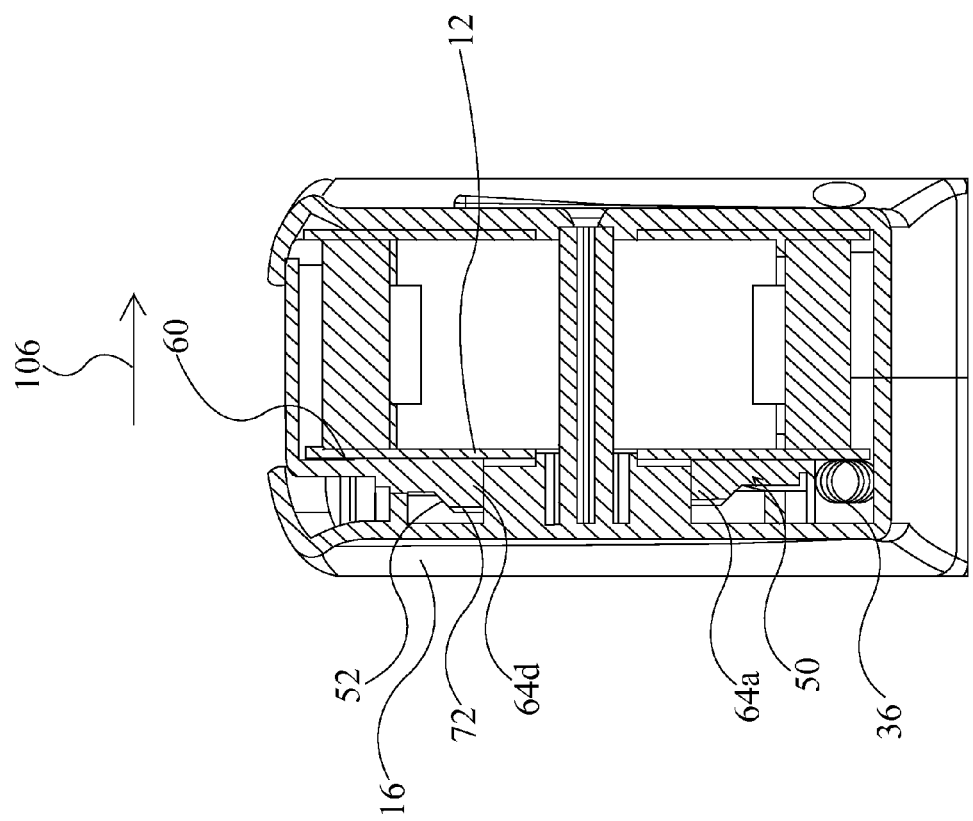
FIG. 8 is an end elevation view, partially in section, showing the disc brake mechanism in the engaged position.

Referring now to FIG. 7, the spring 36 biases the disc brake mechanism 50 towards a released position. In particular, the biasing spring 36 biases the disc 52 such that the cam surfaces, only two of which 64a and 64d are shown in FIG. 7, are each at a bottom of a corresponding cam surface of the first housing half 16. This maintains a spacing 70 between the first side 60 of the disc 52 and the tape reel 12, and allows rotation of the tape reel 12. The lever 56, shown in FIGS. 1 and 2, may be actuated to rotate the disc 52 and move the disc brake mechanism 50 from the released position to an engaged position. Rotation of the disc 52 causes the cam surfaces of the disc 52 to ride up the corresponding cam surfaces of the first housing half 16. As shown in FIG. 8, the first side 60 of the disc 52 moves in the direction indicated by arrow 106 to engage the tape reel 12 and prevent rotation of the tape reel 12. There is then a spacing 72 between the first housing half 16 and the disc 52.

In operation, when the disc brake mechanism 50 is in the released position, the tape reel 12 is allowed to rotate and the spring mechanism biases the tape reel 12 to move the measuring tape 26 towards the retracted position. When the disc brake mechanism 50 is in the engaged position, the inclined cam surfaces cause the first side 60 of the disc 52 to function as a brake pad that applies a continuous frictional force against the tape reel 12. This prevents rotation of the tape reel 12 and freewheeling of the measuring tape 26 towards the retracted position, as long as the user applies a force to the lever 56 to maintain the disc brake mechanism 50 in the engaged position. When the user releases the lever 56, the spring mechanism 32 of the tape reel gradually overcomes the biasing force of the biasing spring 36 and the frictional force applied by the disc 52 against the tape reel. This moves the measuring tape 26 towards the retracted position. The counteracting spring forces of the coil spring 34 and biasing spring 36 together with the frictional force applied against the tape reel 12 control the rate at which the measuring tape 26 moves towards the retracted position.

In another embodiment, the biasing spring 36 may bias the disc brake mechanism 50 towards the engaged position. The disc brake mechanism 50 accordingly functions to restrict movement of the measuring tape 26. When the brake mechanism is moved towards the released position the measuring tape 26 may be moved between the extended and retracted positions, when the user applies a force to the lever 56 to maintain the disc brake mechanism 50 in the released position. The user can control the rate at which the measuring tape 26 moves towards the retracted position by applying a varying force to the lever 56. When the user releases the lever 56, the disc brake mechanism will be biased towards the locked position and movement of the measuring tape 26 will be arrested.

It will be understood by a person skilled in the art that many of the details provided above are by way of example only, and are not intended to limit the scope of the invention which is to be determined with reference to the following claims.

What is claimed is:

1. A tape measure comprising:
    a housing;
    a tape reel rotatably mounted within the housing;

a measuring tape at least partially coiled about the tape reel, the measuring tape being movable between an extended position in which at least a portion of the measuring tape extends outwardly of the housing and a retracted position in which the measuring tape is substantially coiled completely about the tape reel and disposed within the housing;

a spring mechanism for biasing the tape reel to rotate so as to move the measuring tape from the extended position towards the retracted position;

a disc brake mechanism for applying a frictional force to the tape reel to control rotation of the tape reel, the disc brake mechanism including a disc rotatably mounted within the housing, a first side of the disc functioning as a brake pad to engage the tape reel so as to apply the frictional force to the tape reel, and a second side of the disc having a plurality of inclined cam surfaces arranged in annular formation which interact with a plurality of corresponding inclined cam surfaces arranged in annular formation on an inner wall of the housing; and wherein rotation of the disc in a first direction causes the brake pad to move towards the tape reel and rotation of the disc in a second direction causes the brake pad to move away from the tape reel.

2. The tape measure as claimed in claim 1 wherein the spring mechanism includes a coiled flat spring.

3. The tape measure as claimed in claim 1 further including a lever for rotating the disc.

4. The tape measure as claimed in claim 1 further including a biasing spring for biasing the disc to rotate in the first direction.

5. The tape measure as claimed in claim 1 further including a biasing spring for biasing the disc to rotate in the second direction.

6. The tape measure as claimed in claim 1 wherein on the second side of the disc there are eight inclined cam surfaces each of which is inclined 40 degrees, and on the inner wall of the housing there are eight corresponding cam surfaces each of which is inclined 40 degrees.

7. A tape measure comprising:
a housing;
a tape reel rotatably mounted within the housing;
a measuring tape at least partially coiled about the tape reel, the measuring tape being movable between an extended position in which at least a portion of the measuring tape extends outwardly of the housing and a retracted position in which the measuring tape is substantially coiled completely about the tape reel and disposed within the housing;
a spring mechanism for biasing the tape reel to rotate so as to move the measuring tape from the extended position towards the retracted position;
a disc brake mechanism for applying a frictional force to the tape reel to control rotation of the tape reel and movement of the measuring tape from the extended position towards the retracted position, the disc brake mechanism including a disc rotatably mounted within the housing and a biasing spring for biasing the disc, a first side of the disc functioning as a brake pad to engage the tape reel so as to apply the frictional force to the tape reel, and a second side of the disc having a plurality of inclined cam surfaces arranged in annular formation which interact with a plurality of corresponding inclined cam surfaces arranged in annular formation on an inner wall of the housing; and
wherein rotation of the disc in a first direction causes the brake pad to move towards the tape reel and rotation of the disc in a second direction causes the brake pad to move away from the tape reel, and the biasing spring biases the disc to rotate in the first direction.

8. The tape measure as claimed in claim 7 wherein the spring mechanism includes a coiled flat spring.

9. The tape measure as claimed in claim 7 further including a lever for rotating the disc.

10. The tape measure as claimed in claim 7 wherein on the second side of the disc there are eight inclined cam surfaces each of which is inclined 40 degrees, and on the inner wall of the housing there are eight corresponding cam surfaces each of which is inclined 40 degrees.

11. A tape measure comprising:
a housing;
a tape reel rotatably mounted within the housing;
a measuring tape at least partially coiled about the tape reel, the measuring tape being movable between an extended position in which at least a portion of the measuring tape extends outwardly of the housing and a retracted position in which the measuring tape is substantially coiled about the tape reel and disposed within the housing;
a spring mechanism for biasing the tape reel to rotate so as to move the measuring tape from the extended position towards the retracted position;
a disc brake mechanism for applying a frictional force to the tape reel to control rotation of the tape reel and movement of the measuring tape from the extended position towards the retracted position, the disc brake mechanism including a disc rotatably mounted within the housing and a biasing spring for biasing the disc, a first side of the disc functioning as a brake pad to engage the tape reel so as to apply the frictional force to the tape reel, and a second side of the disc having a plurality of inclined cam surfaces arranged in annular formation which interact with a plurality of corresponding inclined cam surfaces arranged in annular formation on an inner wall of the housing; and
wherein rotation of the disc in a first direction causes the brake pad to move towards the tape reel and rotation of the disc in a second direction causes the brake pad to move away from the tape reel, and the biasing spring biases the disc to rotate in the second direction.

12. The tape measure as claimed in claim 11 wherein the spring mechanism includes a coiled flat spring.

13. The tape measure as claimed in claim 11 further including a lever for rotating the disc.

14. The tape measure as claimed in claim 11 wherein on the second side of the disc there are eight inclined cam surfaces each of which is inclined 40 degrees, and on the inner wall of the housing there are eight corresponding cam surfaces each of which is inclined 40 degrees.

* * * * *